United States Patent
Shikata

(10) Patent No.: US 11,172,188 B2
(45) Date of Patent: Nov. 9, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yasushi Shikata, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/837,852

(22) Filed: Apr. 1, 2020

(65) Prior Publication Data

US 2020/0344460 A1 Oct. 29, 2020

(30) Foreign Application Priority Data

Apr. 25, 2019 (JP) .............................. JP2019-084152

(51) Int. Cl.
| | |
|---|---|
| *H04N 13/282* | (2018.01) |
| *H04N 13/279* | (2018.01) |
| *H04N 5/232* | (2006.01) |
| *H04N 5/247* | (2006.01) |

(52) U.S. Cl.
CPC ..... *H04N 13/282* (2018.05); *H04N 5/232121* (2018.08); *H04N 5/247* (2013.01); *H04N 13/279* (2018.05)

(58) Field of Classification Search
None
See application file for complete search history.

(56) References Cited

U.S. PATENT DOCUMENTS

| | | | |
|---|---|---|---|
| 2002/0118969 A1* | 8/2002 | Kanade | H04N 5/23212 396/322 |
| 2003/0053805 A1* | 3/2003 | Kanayama | G02B 23/14 396/374 |
| 2003/0210329 A1* | 11/2003 | Aagaard | H04N 5/247 348/159 |
| 2015/0042812 A1* | 2/2015 | Tang | G06K 9/00342 348/157 |
| 2015/0341621 A1* | 11/2015 | Aagaard | H04N 17/002 348/47 |

FOREIGN PATENT DOCUMENTS

JP 2014-215828 A 11/2014

* cited by examiner

*Primary Examiner* — Rebecca A Volentine
(74) *Attorney, Agent, or Firm* — Canon U.S.A., Inc. IP Division

(57) ABSTRACT

An information processing apparatus determines a position on an object, based on a distance between a set position and an imaging apparatus configured to capture an image of a predetermined position on an object and be used for generating a virtual viewpoint image, the set position being located on a line segment connecting the imaging apparatus and the predetermined position, and being a position of a focus point closer than the predetermined position when viewed from the imaging apparatus, and sets, for a plurality of imaging apparatuses, the determined position as a focus point of the imaging apparatus.

13 Claims, 15 Drawing Sheets

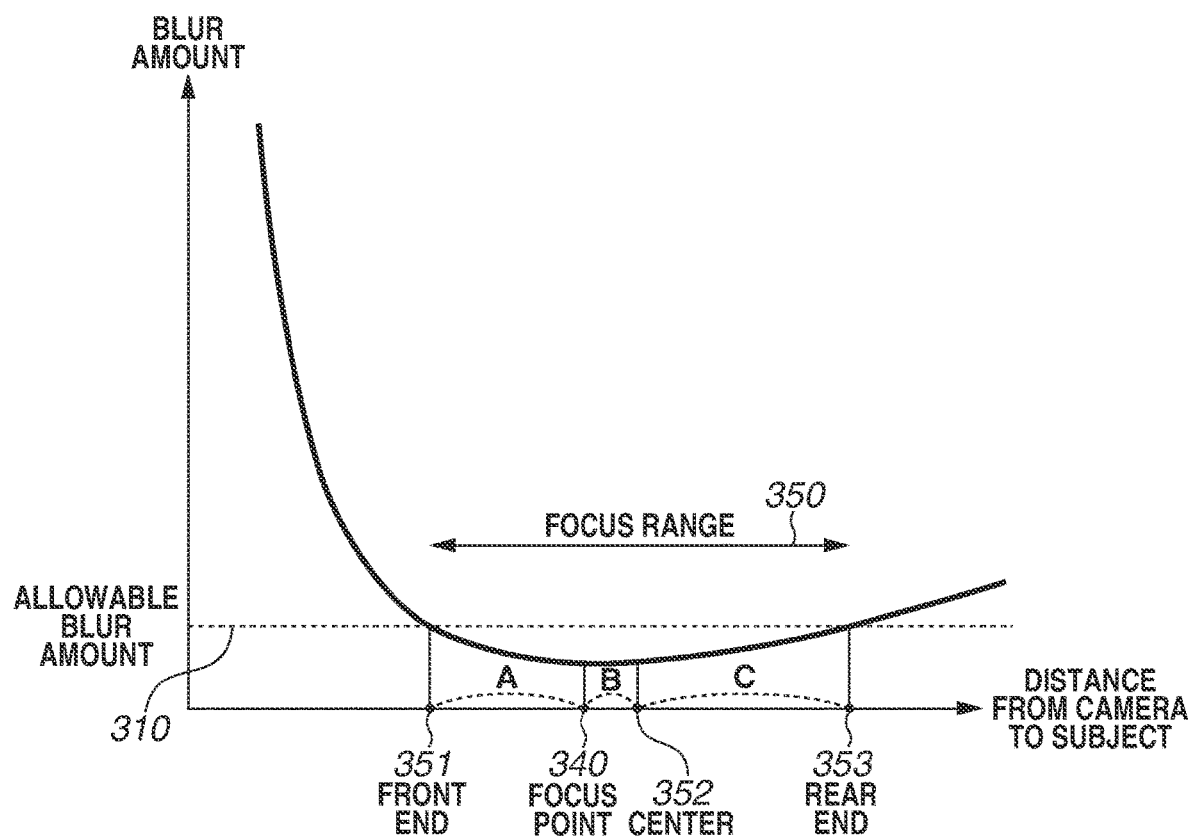

FOCUS FRAME

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

In recent years, there has been a technique of installing a plurality of imaging apparatuses at different positions, capturing images of a subject synchronously by the plurality of imaging apparatuses, and generating, using the images captured from a plurality of viewpoints, not only images from the installation positions of the imaging apparatuses but also an image from an arbitrary viewpoint as a virtual viewpoint image.

The generation and browse of a virtual viewpoint image based on images captured from the plurality of viewpoints can be implemented in the following manner, for example. First of all, a plurality of imaging apparatuses is installed to capture images of a subject. The captured images are gathered to an image generation apparatus such as a server apparatus. The image generation apparatus generates a virtual viewpoint image by performing processing, such as rendering based on a virtual viewpoint, using the images captured by the plurality of imaging apparatuses. The image generation apparatus then displays the virtual viewpoint image on a viewing terminal of a user.

By using captured images of a match of soccer or basketball, spectacular viewpoint content can be created through generating a virtual image in accordance with a virtual viewpoint designated by an image content creator. In addition, a user viewing the content can freely changes a viewpoint with a controller or a tablet included in a viewed terminal. The image generation apparatus generates a virtual viewpoint image with respect to the viewpoint, and the user can thereby watch the match from a desired viewpoint. Thus, in a service that uses a virtual viewpoint image, the user can feel realistic sensation as if the user existed in such a scene, as compared with a conventional service in which a viewpoint cannot be arbitrarily changed. Japanese Patent Application Laid-Open No. 2014-215828 discusses a technique of generating a virtual viewpoint image viewed from a virtual viewpoint designated by a user, using images captured by a plurality of imaging apparatuses.

In the case of generating a virtual viewpoint image of a predetermined region using captured images acquired by a plurality of imaging apparatuses, a high quality virtual viewpoint image can be generated, if the predetermined region is included in a shared portion of focus ranges (in-focus ranges) of the imaging apparatuses. Nevertheless, when the shared portion of the focus ranges of the imaging apparatuses is small, a region in the generated virtual viewpoint image that is not included in the shared portion can possibly become large. Accordingly, the image quality of the virtual viewpoint image lowers.

In view of the foregoing, a method of extending a region in which a virtual viewpoint image is generated can be considered by adjusting a focus position of each imaging apparatus. However, in such a method, the focus position of each imaging apparatus exists in the air, and thus it cannot be visually checked whether a focus is actually placed on an tended position.

Japanese Patent Application Laid-Open No. 2014-215828 does not discuss the focus position of each imaging apparatus. Thus, Japanese Patent Application Laid-Open No. 2014-215828 cannot solve the above-described problems.

SUMMARY

The present disclosure is directed to easily checking focus states of a plurality of imaging apparatuses even if focus ranges of the imaging apparatus are extended.

According to an aspect of the present disclosure, an information processing apparatus includes a determination unit configured to determine a position on an object, based on a distance between a set position and an imaging apparatus configured to capture an image of a predetermined position on an object and be used for generating a virtual viewpoint image, the set position being located on a line segment connecting the imaging apparatus and the predetermined position, and being a position of a focus point closer than the predetermined position when viewed from the imaging apparatus, and a setting unit configured to set, for a plurality of imaging apparatuses, the position determined by the determination unit as a focus point of the imaging apparatus.

Further features of the present disclosure will become apparent from the following description of exemplary embodiments with reference to the attached drawings.

BRIEF DESCRIPTION OF THE DRAWINGS

FIG. 4 is a diagram illustrating an example of a relationship between a distance from an imaging apparatus to a subject and a blur amount.

DESCRIPTION OF THE EMBODIMENTS

Hereinafter, exemplary embodiments of the present disclosure will be described in detail with reference to the drawings.

An information processing system according to a first exemplary embodiment sets, for each of a plurality of imaging apparatuses, in-focus point on which a focus is achieved, closer to a corresponding imaging apparatus than an observation point (a gaze point). The information processing system can thereby extend a total region of focus regions of the plurality of imaging apparatuses, and then output information that makes the validity visually checkable by a user. In-focus refers to a state that focus is achieved. A focus region refers to a region in which an in-focus image can be captured by a corresponding imaging apparatus. An observation point (a gaze point) refers to an intersection point of an optical axis of an imaging apparatus (optical axis of a lens) and an imaging field. In the present exemplary embodiment, the description will be given of an example in which the positions of observation points of a plurality of imaging apparatuses are set to a common position. However, the positions of observation points need not be set to a common position for the plurality of imaging apparatuses. The respective observation points of the plurality of imaging apparatuses may be set to different positions. Further, optical axes of the plurality of imaging apparatuses may be oriented to a predetermined region including an observation point.

Figure 1:
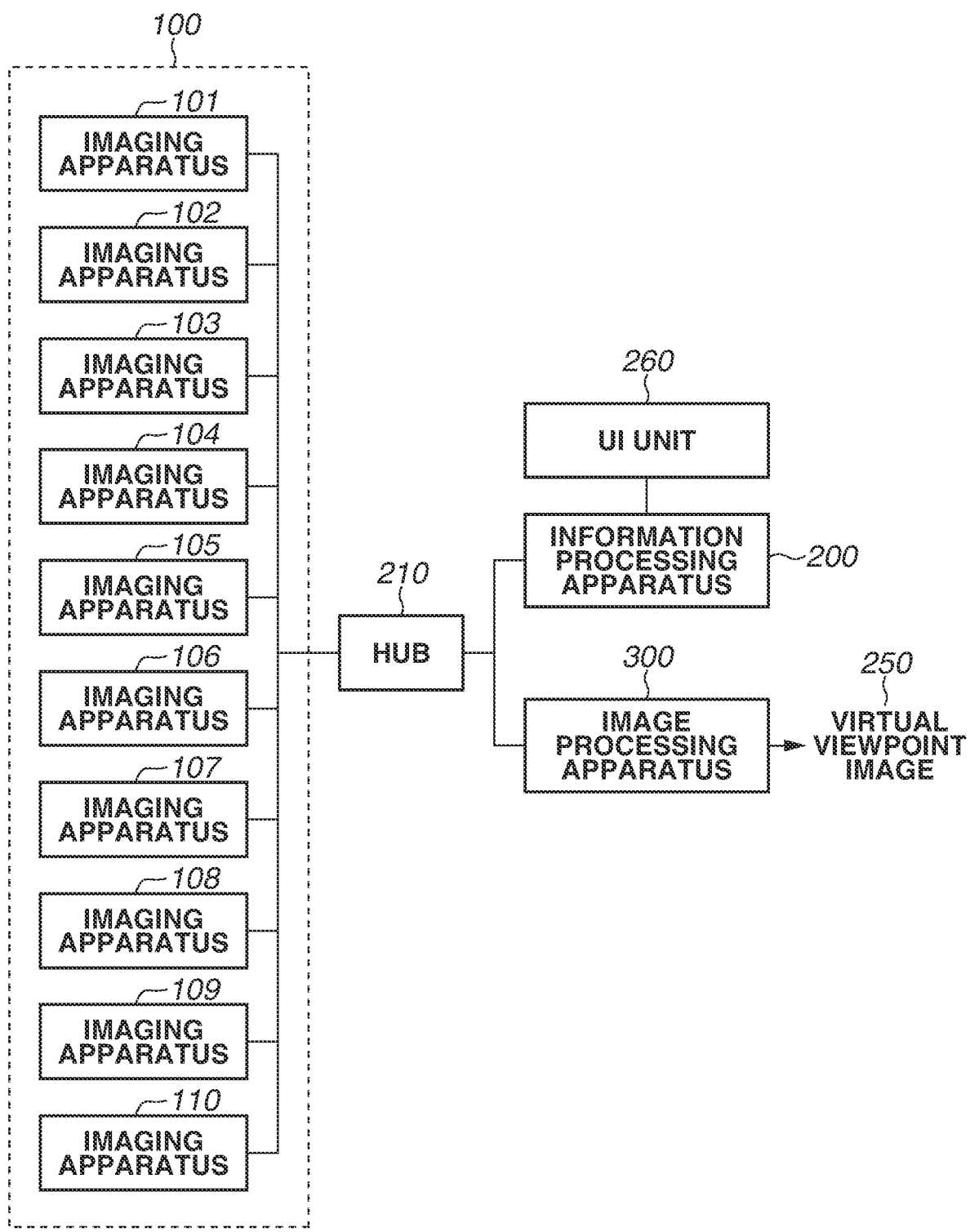
FIG. 1 is a block diagram illustrating an example of a system configuration of an information processing system.

FIG. 1 is a block diagram illustrating an example of a system configuration of the information processing system according to the present exemplary embodiment. The information processing system includes imaging apparatuses 101 to 110, an information processing apparatus 200, a user interface (UI) unit 260, a hub 210, and an image processing apparatus 300. The imaging apparatuses 101 to 110, the information processing apparatus 200, and the image processing apparatus 300 are connected via the hub 210 such that communication can be performed with each other.

The imaging apparatuses 101 to 110 are imaging apparatuses arranged at different positions. These apparatuses include network cameras, each of which captures an image of an imaging target from a different viewpoint, and camera controllers, each of which is connected with a network camera. Hereinafter, the imaging apparatuses 101 to 110 will be collectively referred to as imaging apparatuses 100.

The imaging apparatuses 101 to 110 each transmit a captured image to the image processing apparatus 300 via the hub 210.

The information processing apparatus 200 is configured to control image capturing and the state of each of the imaging apparatuses 100. In the present exemplary embodiment, the information processing apparatus 200 is assumed to be a personal computer (PC). However, the information processing apparatus 200 may be another information processing apparatus, such as a server apparatus or a tablet apparatus.

The hub 210 is a network relay device.

A UI unit 260 is an input-output apparatus used for inputting information to, and outputting information from the information processing apparatus 200.

The image processing apparatus 300 is configured to generate a virtual viewpoint image 250 based on images captured by the imaging apparatuses 100 and a set virtual viewpoint. In the present exemplary embodiment, the image processing apparatus 300 is assumed to be a server apparatus. However, the image processing apparatus 300 may be another information processing apparatus, such as a PC or a tablet apparatus.

The image processing apparatus 300 executes foreground-background separation based on images input from the imaging apparatuses 100, generates a three-dimensional model from a foreground, and generates a virtual viewpoint image onto the three-dimensional model by rendering a color viewed from a virtual imaging apparatus. However, a method of generating a virtual viewpoint video is not limited to this. The image processing apparatus 300 may generate a virtual viewpoint image using another method, such as a billboard method that does not create a three-dimensional model.

In the present exemplary embodiment, the system configuration of the information processing system is the configuration illustrated in FIG. 1. As another example, the information processing system may have another system configuration. For example, each of the imaging apparatuses 100 may be directly connected to the information processing apparatus 200 and the image processing apparatus 300, or the imaging apparatuses 100 may be daisy chained. The number of the imaging apparatuses 100 is not also limited to ten, and may be eleven or more, or nine or less.

Figure 2:
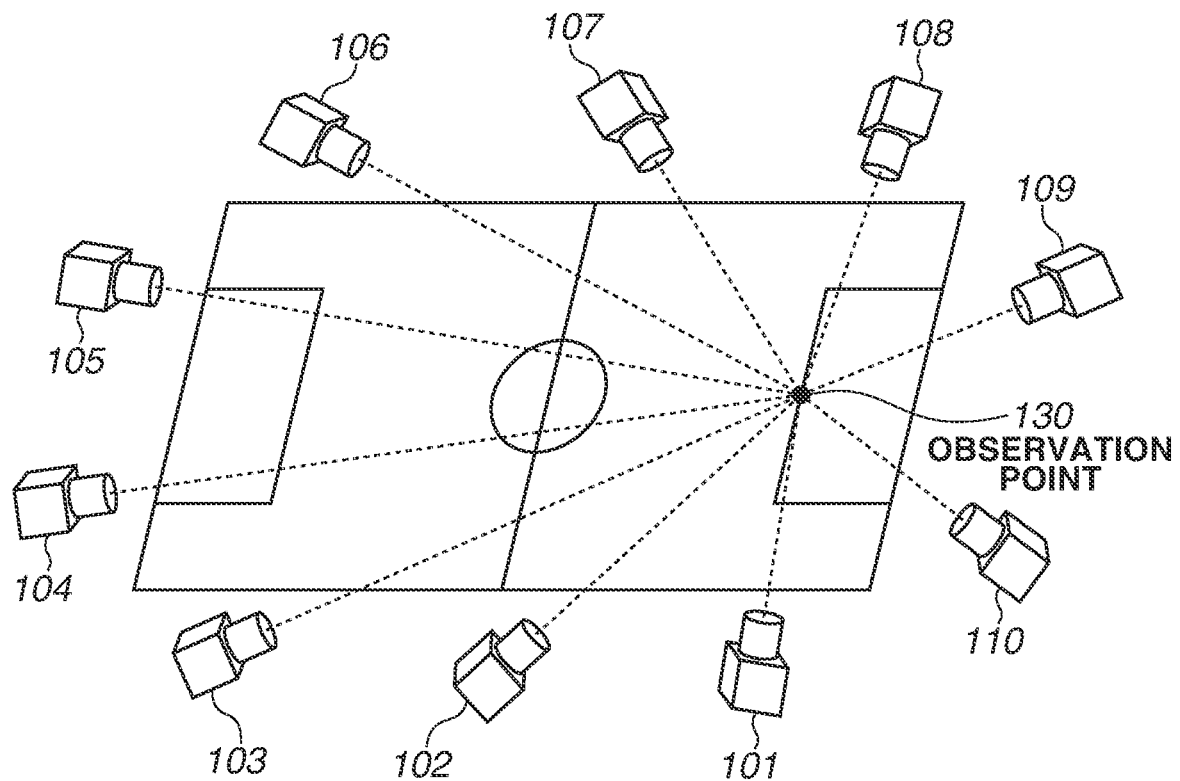
FIG. 2 is a diagram illustrating an example of arrangement statuses of a plurality of imaging apparatuses.

FIG. 2 is a diagram illustrating an example of the respective arrangement statuses of the imaging apparatuses 101 to 110 according to the present exemplary embodiment. As illustrated in FIG. 2, the imaging apparatuses 101 to 110 are arranged to surround a field of a stadium, and oriented to the directions of one observation point (predetermined position) 130.

The information processing system generates a virtual viewpoint image of a scene that occurs near the observation point 130, using images captured by the imaging apparatuses 100. The information processing apparatus 200 performs focusing control of the imaging apparatuses 100. In the present exemplary embodiment, an observation point of the imaging apparatuses 100 is one observation point 130. As another example, the imaging apparatuses 100 may have a plurality of observation points. In this case, each of the imaging apparatuses 100 is directed to any one of the plurality of observation points.

Figure 3A:
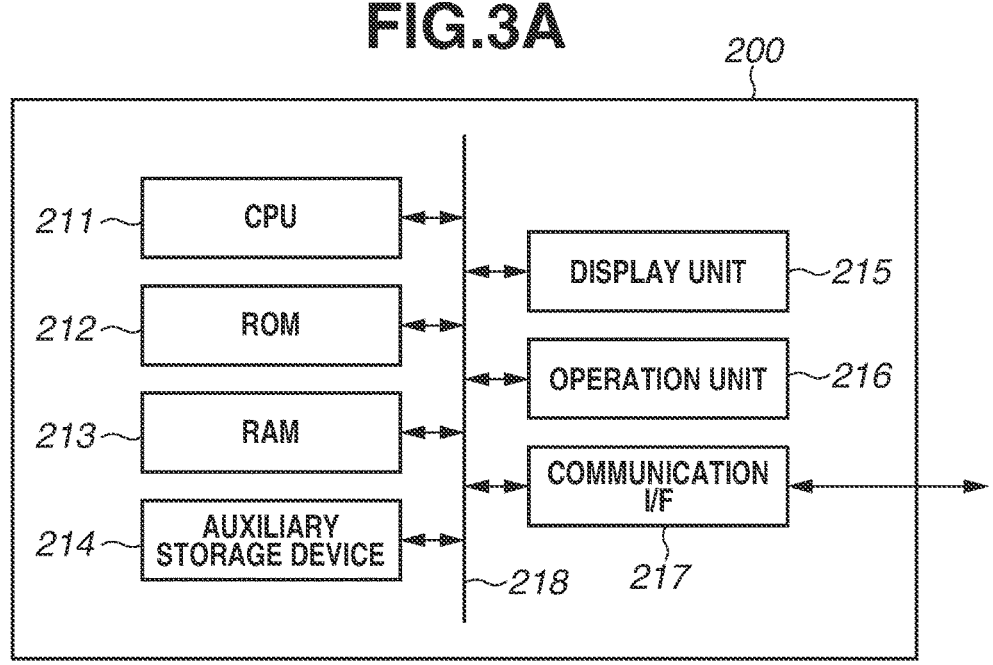
FIGS. 3A and 3B are diagrams illustrating an example of a hardware configuration and a functional configuration of an information processing apparatus, respectively.

FIG. 3A is a block diagram illustrating an example of a hardware configuration of the information processing apparatus 200.

The information processing apparatus 200 includes a central processing unit (CPU) 211, a read-only memory (ROM) 212, a random access memory (RAM) 213, an auxiliary storage device 214, a display unit 215, an operation unit 216, and a communication interface (I/F) 217. These components are connected via a bus 218 such that communication can be performed with each other.

The CPU 211 controls the entire information processing apparatus 200 using computer programs and data stored in the ROM 212 and the RAM 213. The information processing apparatus 200 may include one or a plurality of pieces of dedicated hardware different from the CPU 211, and the dedicated hardware may execute at least part of processing to be performed by the CPU 211. Examples of the dedicated hardware include an application specific integrated circuit (ASIC), a field programmable gate array (FPGA), and a digital signal processor (DSP).

The ROM 212 stores a program that needs not be changed. The RAM 213 temporarily stores a program and data supplied from the auxiliary storage device 214, and data supplied from the outside via the communication I/F 217.

The auxiliary storage device 214 includes a hard disk drive, and stores various types of data, such as image data and voice data.

The display unit 215 includes a liquid crystal display or a light-emitting diode (LED), and displays a graphical user interface (GUI) for a user operating the information processing apparatus 200. The operation unit 216 includes a keyboard, a mouse, a joystick, or a touch panel. The operation unit 216 receives operations performed by the user and inputs various instructions to the CPU 211. The communication I/F 217 is used for communicating with a device outside the information processing apparatus 200. For example, in a case where the information processing apparatus 200 is connected with an external device in a wired manner, a communication cable is connected to the communication I/F 217. In a case where the information processing apparatus 200 has a function of wirelessly communicating with an external device, the communication I/F 217 includes an antenna. The bus 218 connects the components of the information processing apparatus 200 and conveys information.

The CPU 211 executes processing according to the program stored in the ROM 212 or the auxiliary storage device 214, and thereby implementing functions of the information processing apparatus 200, which will be described below with reference to FIG. 3B, and flowchart processing as illustrated in FIGS. 11 to 13, 15, and 16.

In the present exemplary embodiment, the display unit 215 and the operation unit 216 are included in the information processing apparatus 200. However, at least one of the display unit 215 and the operation unit 216 may be an independent apparatus outside the information processing apparatus 200. In this case, the CPU 211 may operate as a display control unit to control the display unit 215, and as an operation control unit to control the operation unit 216.

In the present exemplary embodiment, a hardware configuration of the image processing apparatus 300 is similar to that of the information processing apparatus 200, which is illustrated in FIG. 3A.

A CPU of the image processing apparatus 300 executes processing according to a program stored in a ROM or an auxiliary storage device of the image processing apparatus 300, and thereby implementing functions and processing of the image processing apparatus 300.

Figure 3B:
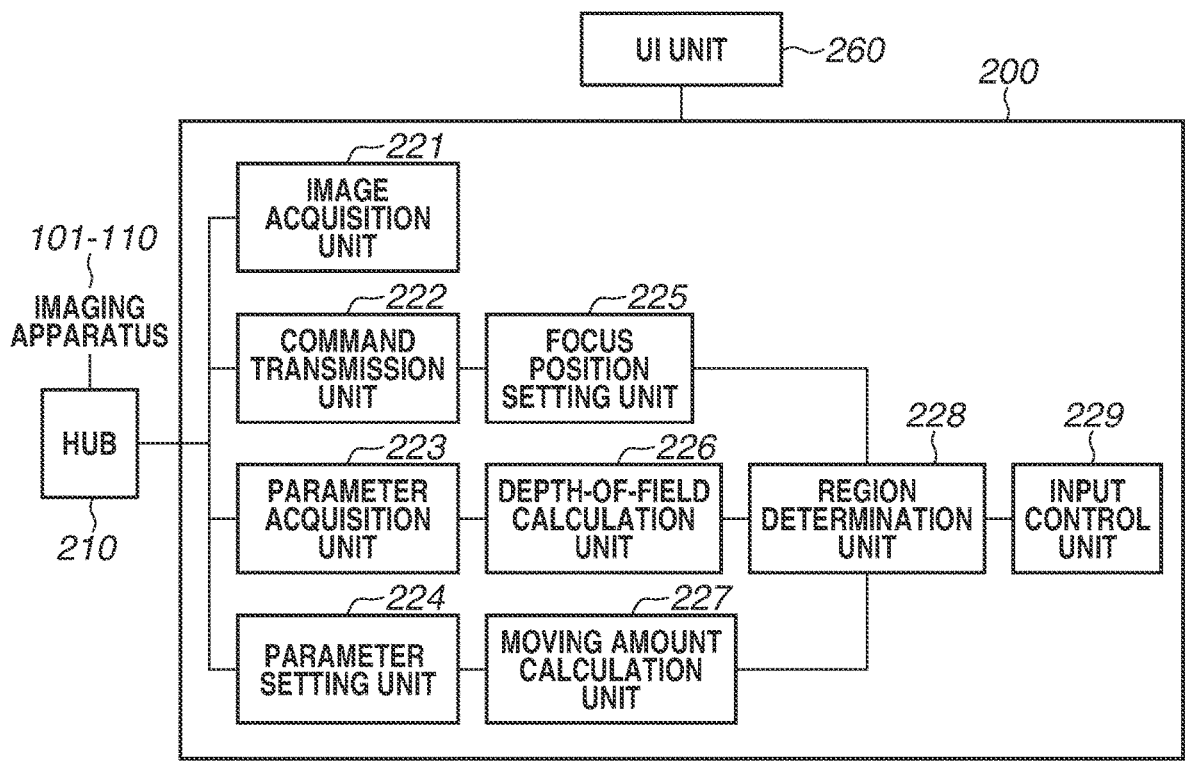

FIG. 3B is a block diagram illustrating an example of a functional configuration of the information processing apparatus 200.

The information processing apparatus 200 includes an image acquisition unit 221, a command transmission unit 222, a parameter acquisition unit 223, a parameter setting unit 224, a focus position setting unit 225, a depth-of-field calculation unit 226, a moving amount calculation unit 227, a region determination unit 228, and an input control unit 229.

The image acquisition unit 221 acquires images from each of the imaging apparatuses 100, and sends the acquired images to the UI unit 260. The UI unit 260 displays the captured images from each of the imaging apparatuses 100, and receives information input from the user who has checked the displayed captured images. The information includes an adjustment instruction of an angle of view or an observation point, and the designation of a focus position. The user checks a screen for checking a focus state displayed on the UI unit 260, and thereby recognizing a focus state of each of the imaging apparatuses 100.

The command transmission unit 222 transmits a command to each of the imaging apparatuses 100, and transmits an instruction for controlling to start/stop image capturing and focusing or the like.

The parameter acquisition unit 223 acquires parameters (e.g., zoom value, focus value, and aperture value) set each of the imaging apparatuses 100 at a processing point, from a corresponding one of the imaging apparatuses 100. Regarding focus, the parameter acquisition unit 223 acquires not only a physical position value of a focus lens but also a contrast value of a focus region.

The parameter setting unit 224 transmits a moving amount of a focal length as a position value of a focus lens to a corresponding imaging apparatus, and instructs the imaging apparatus to set the position value. The parameter setting unit 224 thereby changes the focus position of the imaging apparatus. In addition to the position value of the focus lens, the parameter setting unit 224 also performs settings of other parameters such as a zoom value and an aperture value for the corresponding imaging apparatus.

The focus position setting unit 225 performs setting control of a focus position of an imaging apparatus in an imaging screen of the imaging apparatus to a specified location. The focus position setting unit 225 can set the focus position in a region deviated from the screen center.

The depth-of-field calculation unit 226 calculates depths of field of the front and rear sides of a focus point of each of the imaging apparatuses 100 based on the parameters acquired by the parameter acquisition unit 223 from each of the imaging apparatuses 100. The moving amount calculation unit 227 converts a moving distance of a focus point into a focal length moving amount of a lens for each of the imaging apparatuses 100.

The region determination unit 228 determines a midair position as a focus point of each of the imaging apparatuses 100 in such a manner as to extend the total region of focus regions of the imaging apparatuses 100 as compared with a case where each of the imaging apparatuses 100 sets the observation point 130 as a focus point. Hereinafter, the determined focus point will be referred to as a space focus point. Hereinafter, the total region of the focus regions of the imaging apparatuses 100 will be referred to as a total focus region. The region determination unit 228 determines the position of an actual focus point for each of the imaging apparatuses 100 in the following manner. More specifically, the region determination unit 228 determines, as an actual focus point, a position on the surface of an object existing near the observation point 130, in such a manner that a distance between an imaging apparatus and the actual focus point becomes equal to a distance between the imaging apparatus and a space focus point.

The input control unit 229 receives, from the outside, an input of three-dimensional shape model data of a stadium and distance information between each of the imaging apparatuses 100 and an observation point, and transmits the received input to the region determination unit 228. The three-dimensional shape model data will be described below with reference to FIG. 8 and the like. The three-dimensional shape model data is an example of three-dimensional shape data.

A relationship between a distance from an imaging apparatus and a blur amount of a lens of the imaging apparatus will be described with reference to FIG. 4. A graph illustrated in FIG. 4 is a graph indicating a relationship between a blur amount and a distance from an imaging apparatus to a subject. In the imaging apparatus, certain aperture value and focus value are set. A focus of the imaging apparatus is placed on a focus point 340 being a subject position. As illustrated in FIG. 4, a blur amount rapidly increases from the focus point 340 toward the front side (viewed from the imaging apparatus), and the blur amount slowly increases toward the rear side (back side) (viewed from the imaging apparatus).

A blur amount invisible to human eyes is predefined as an allowable blur amount 310. In this case, an in-focus range corresponds to a focus range 350. At a front end 351 of the focus range 350, a distance from the focus point 340 becomes "A". At a rear end 353, a distance from the focus point 340 becomes "B+C", and a center 352 of the focus range 350 becomes closer to the back side than the focus point 340. A length of "A+B" equals to a length of "C".

Figure 5:
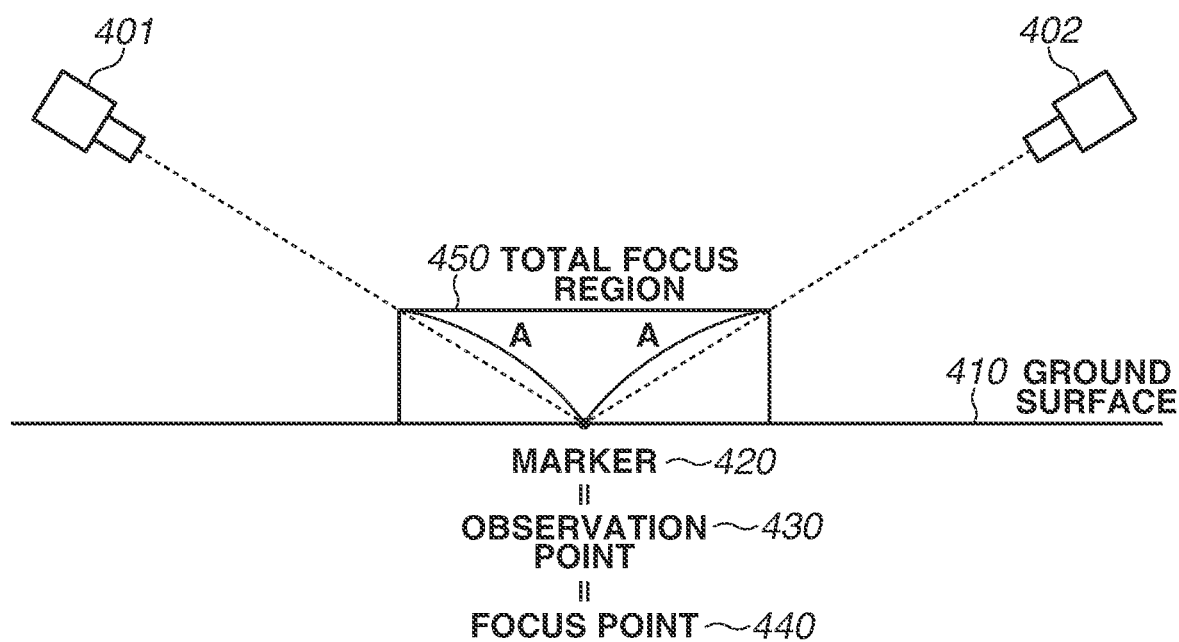
FIG. 5 is a diagram illustrating an example of a focus region in a case where an observation point is set as a focus point.

A conventional focusing method used in an imaging apparatus will be described with reference to FIG. 5. FIG. 5 illustrates a status in which imaging apparatuses 401 and 402 are arranged to be directed to a marker 420.

In the example illustrated in FIG. 5, the imaging apparatuses 401 and 402 place focuses on the marker 420 using the position of the marker 420 as an observation point 430, and sets the position of the marker 420 being the observation point 430, as a focus point 440. In other words, in the example illustrated in FIG. 5, the position of the marker 420, the observation point 430, and the focus point 440 correspond to the same position. In a case where a plurality of imaging apparatuses is arranged to surround an observation point, a total focus region 450 (the total region of the respective focus regions of the plurality of imaging apparatuses) becomes a range having an end portion corresponding to the position at a distance A from the observation point 430 toward a corresponding imaging apparatus. In a case where distances from the observation point to the imaging apparatuses vary, a value of distance A also varies according to a corresponding imaging apparatus.

In this case, since the plurality of imaging apparatuses performs image capturing while focusing on the marker 420 being an identical point, the overlap of focus regions of the plurality of imaging apparatuses is broadly generated near the marker 420.

Figure 6:
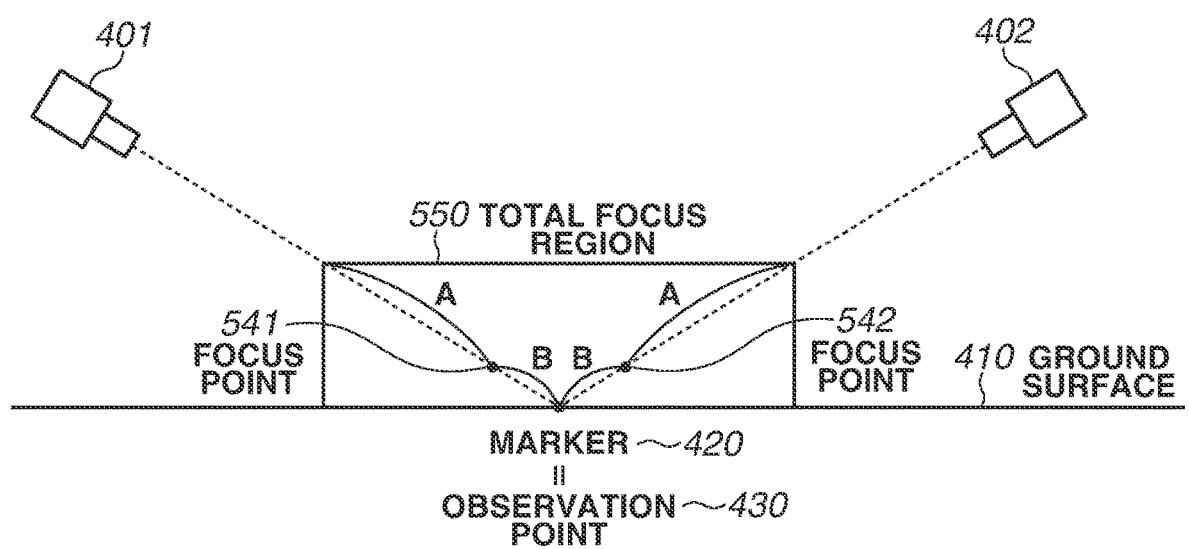
FIG. 6 is a diagram illustrating an example of a focus region in a case where a focus point is moved toward the front side.

A method of extending a total focus region will be described with reference to FIG. 6. Similarly to FIG. 5, FIG. 6 illustrates a status in which the imaging apparatuses 401 and 402 are directed to the marker 420.

In the example illustrated in FIG. 6, the imaging apparatuses 401 and 402 each move the position of the focus point in the following manner as compared with the status illustrated in FIG. 5. The imaging apparatuses 401 and 402 each move the position of the focus point from the observation point 430 toward a corresponding imaging apparatus along a line segment connecting the imaging apparatus and the observation point 430. Accordingly, the focus point of the imaging apparatus 401 becomes a focus point 541, and the focus point of the imaging apparatus 402 becomes a focus point 512. The focus points 541 and 542 are space focus points that are located in the air on the respective optical axes of the imaging apparatuses 401 and 402. In this case, a total focus region 550 becomes a range having an end portion corresponding to the position at a distance "A+B" from the position of the marker 420 toward a corresponding imaging apparatus, and thus becomes a range wider than the total focus region 450. In a case where distances from the observation point to the imaging apparatuses vary, a value of a distance B also varies according to a corresponding imaging apparatus. Each of the positions of the focus points 541 and 542 is an example of a set position at which a space focus point is set.

If the focus point of an imaging apparatus is set to a space focus point like the focus points 541 and 542, a focus region of the imaging apparatus can be extended. However, since the focus point exists in the air, it becomes difficult to check whether a focus is actually achieved.

Figure 7:
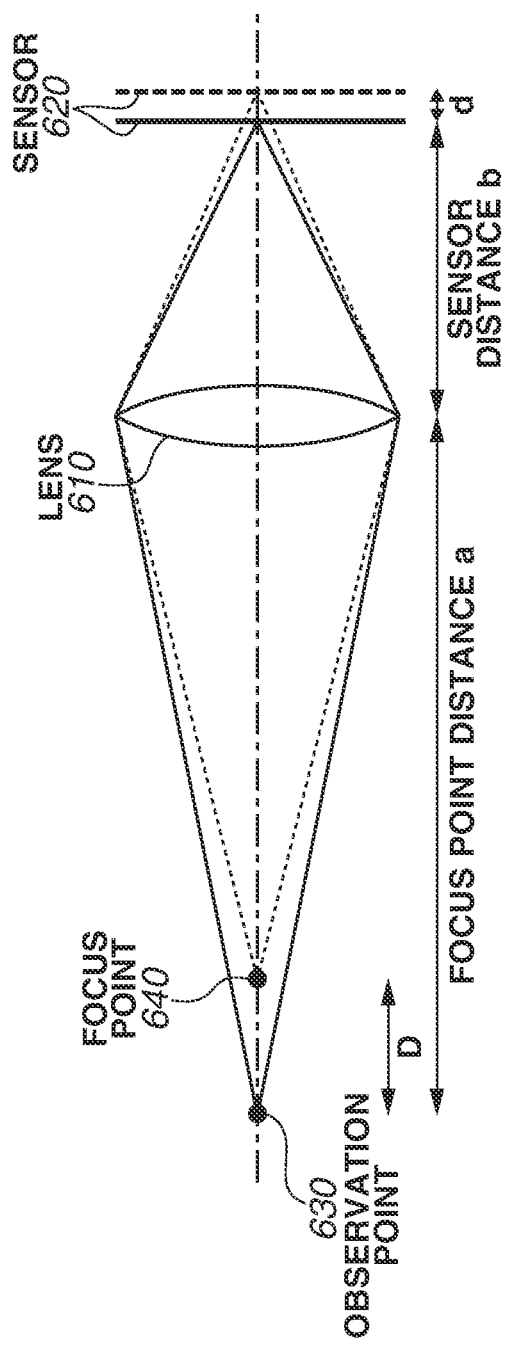
FIG. 7 is a diagram illustrating an example of a relationship between a focal length and a focus point.

A method of moving a focus point of an imaging apparatus will be described with reference to FIG. 7.

A relational expression represented as "1/a+1/b=1/f" is satisfied by a distance "a" between a lens 610 and a focus point of an imaging apparatus and a distance "b" between the lens 610 and a sensor (e.g., image sensor) 620. A sensor distance (focal length) obtained when parallel light enters the lens is denoted by "f". As illustrated in FIG. 7, when the position of the image sensor 620 is moved by a moving amount d with respect to the lens 610 from a state in which an observation point 630 is set as a focus point, the focus point moves by a moving amount "D", and comes to the position of a focus point 640.

If the moving amount "D" of the focus point is designated, a moving amount by which the lens 610 is to be moved can be calculated. Hereinafter, the word "focal length" will appropriately refer not only to the focal length "f" but also to the sensor distance "b".

Figure 8:
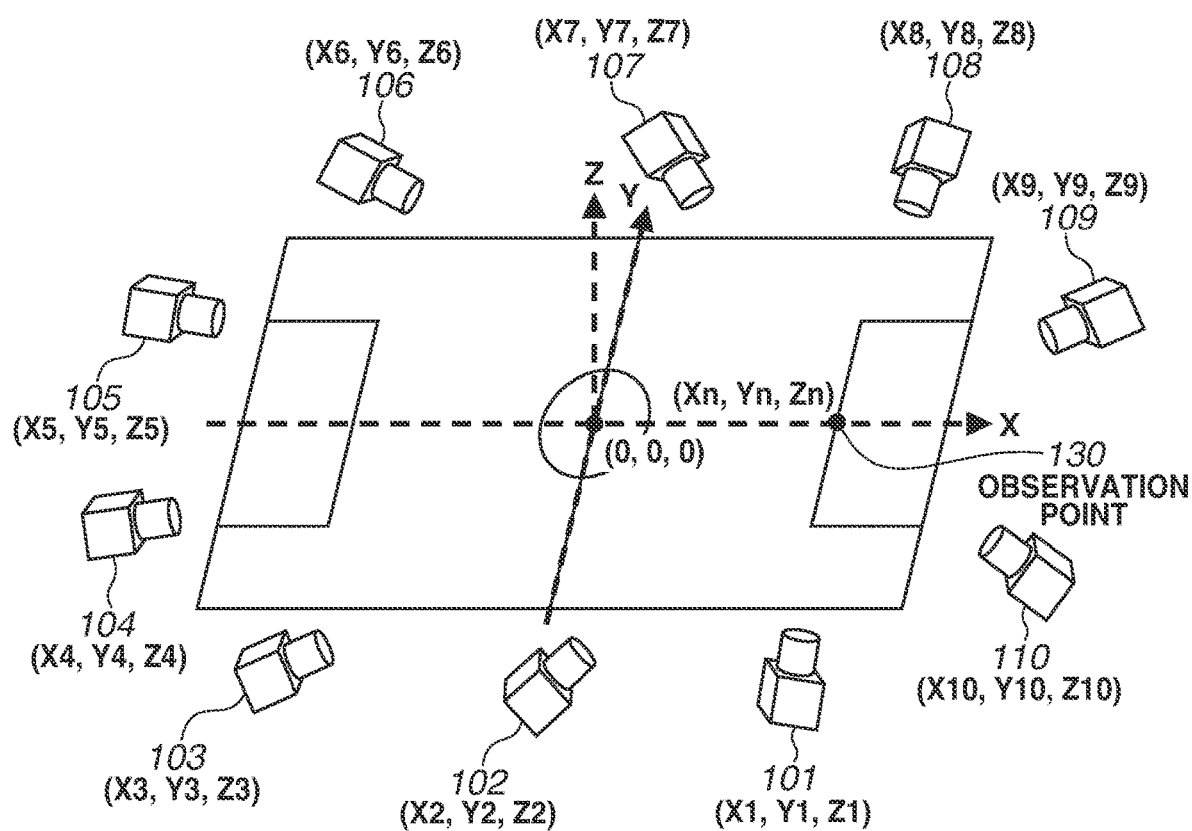
FIG. 8 is a diagram illustrating an example of three-dimensional shape model data.
Figure 9:
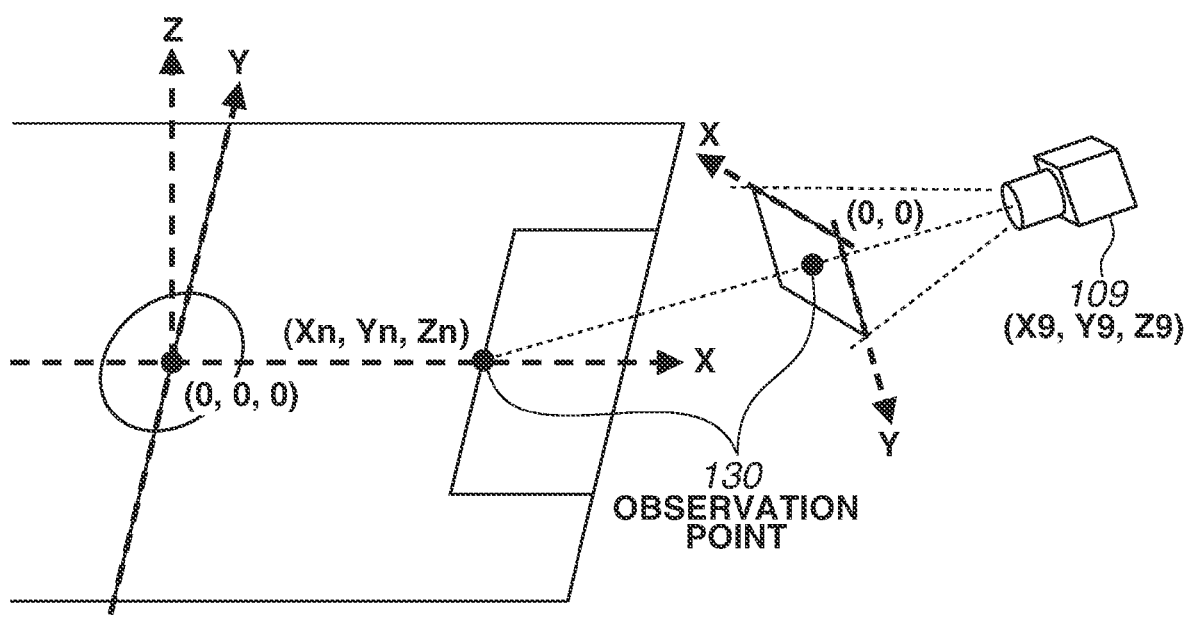
FIG. 9 is a diagram illustrating an example of three-dimensional shape model data.

FIGS. 8 and 9 are diagrams illustrating an example of three-dimensional shape model data of a stadium that is used in the present exemplary embodiment. Hereinafter, the three-dimensional shape model data of the stadium that is used in the present exemplary embodiment will be referred to as stadium model data. The stadium model data at least includes a stadium structure on a three-dimensional coordinate system set in an actual space, the shape of a field surface, and coordinate information of each imaging apparatus 100 and an observation point. The stadium model data is an example of a three-dimensional shape model of an imaging environment.

As illustrated in FIG. 8, the stadium model data includes a three-dimensional coordinate (Xn, Yn, Zn) of the observation point 130 and the respective coordinates of the imaging apparatuses 100 that are set when an origin corresponds to a field center.

As illustrated in FIG. 9, the stadium model data also includes mapping information of a two-dimensional coordinate system of a captured image corresponding to a zoom value of an imaging apparatus and a set three-dimensional coordinate system.

By using the stadium model data, the information processing apparatus 200 can thus obtain a coordinate on a captured image (image sensor surface) to which a three-dimensional coordinate of a position on a set three-dimensional coordinate system corresponds, and obtain one imaging apparatus 100 (e.g., imaging apparatus 109) of the imaging apparatuses 100 that has acquired the captured image. In the present exemplary embodiment, the stadium model data is data created using data of the shape of the stadium measured using a three-dimensional laser scanner. As another example, the stadium model data may be data generated using a design drawing of the stadium.

The overview of a determination method of an actual focus point that is executed for each of the imaging apparatuses 100 by the information processing system according to the present exemplary embodiment will be described with reference to FIG. 10.

Figure 10:
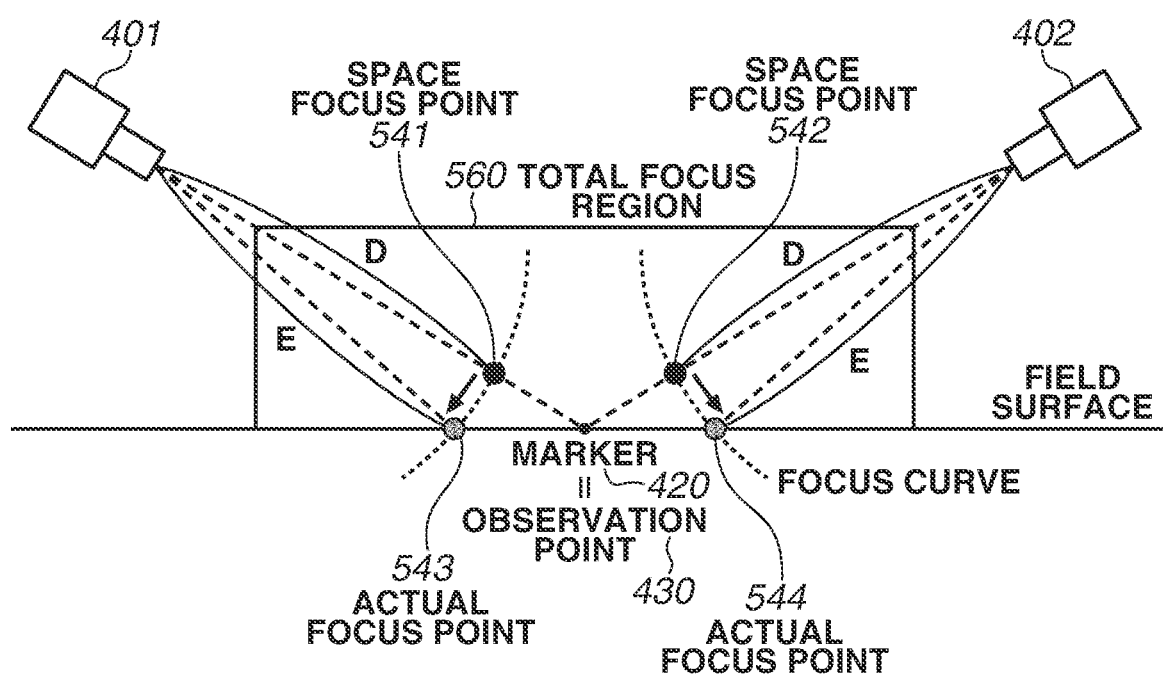
FIG. 10 is a diagram illustrating an example of a relationship between a space focus point and an actual focus point.

Similarly to FIG. 5, FIG. 10 illustrates a status in which the imaging apparatuses 401 and 402 are directed to the marker 420. Processing of determining the respective actual focus points of the imaging apparatuses 401 and 402 will be described with reference to FIG. 10 using a method similar to the determination method of an actual focus point that is executed for each of the imaging apparatuses 100 by the information processing system.

The positions of the focus points that are set to the position of the marker 420 are respectively moved to the focus points 541 and 542 by moving lenses of the imaging apparatuses 401 and 402.

At this time, a distance between a corresponding imaging apparatus and a space focus point is denoted by "D". A point on the field surface at which a distance from an imaging apparatus "E" has a formula of E=D±α, where α is a predefined error, is determined. The determined point is determined as an actual focus point of the imaging apparatus.

In other words, an actual focus point 543 (of the imaging apparatus 401) corresponding to the focus point 541 is located at the position illustrated in FIG. 10. An actual focus point 544 (of the imaging apparatus 402) corresponding to the focus point 542 is located at the position illustrated in FIG. 10.

In the example illustrated in FIG. 10, the positions of the respective actual focus points of the imaging apparatuses 401 and 402 are moved on the field surface, and set to the positions closer to the respective imaging apparatuses 401 and 402 than the observation point 430. Accordingly, the focus point of the imaging apparatus 401 becomes the focus point 543, and the focus point of the imaging apparatus 402 becomes the focus point 544. In this case, a total focus region 560 becomes a range having an end portion corresponding to a position at the distance "A+B" from the position of the actual focus point toward a corresponding imaging apparatus, and thus becomes a range wider than the total focus region 450.

The focus points 543 and 544 are points located on the field surface, and images captured by the imaging apparatuses 401 and 402 are captured images including the field surface on which the focus points are located. Thus, the user can easily check whether a focus is actually placed on the focus point, by visually checking the field surface included in the images.

Figure 11:
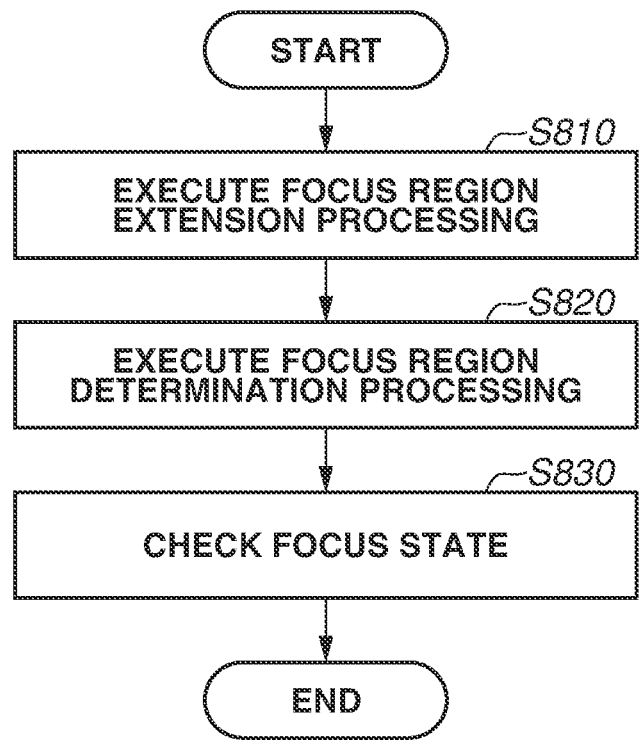
FIG. 11 is a flowchart illustrating an example of processing performed by the information processing apparatus.

An example of focus processing executed by the information processing apparatus 200 for each of the imaging apparatuses 100 will be described with reference to FIG. 11.

In step S810, the CPU 211 executes control processing of expanding a focus region for each of the imaging apparatuses 100. The parameter setting unit 224 thereby expands the focus region of each imaging apparatus by setting a focus point of each of the imaging apparatuses 100 to a space focus point moved closer to the front side than the observation point 130 (viewed from each imaging apparatus). The details of the processing executed in step S810 will be described below with reference to FIG. 12.

In step S820, the CPU 211 executes processing of determining an actual focus point for each of the imaging apparatuses 100. In the present exemplary embodiment, the CPU 211 determines, for each of the imaging apparatuses 100, a point on the field surface having a distance from a corresponding imaging apparatus that is equal to a distance from the imaging apparatus to the focus point (space focus point) moved in step S810, as an actual focus point.

In step S830, the CPU 211 determines a total focus region being the total of the focus regions of the imaging apparatuses 100, and displays an object indicating the determined total focus region, on the UI unit 260 with the object overlapped on an image captured by each of the imaging apparatuses 100. By checking a screen displayed on the UI unit 260, the user recognizes a focus state. The details of processing executed in steps S820 and S830 will be described below with reference to FIG. 13.

Figure 12:
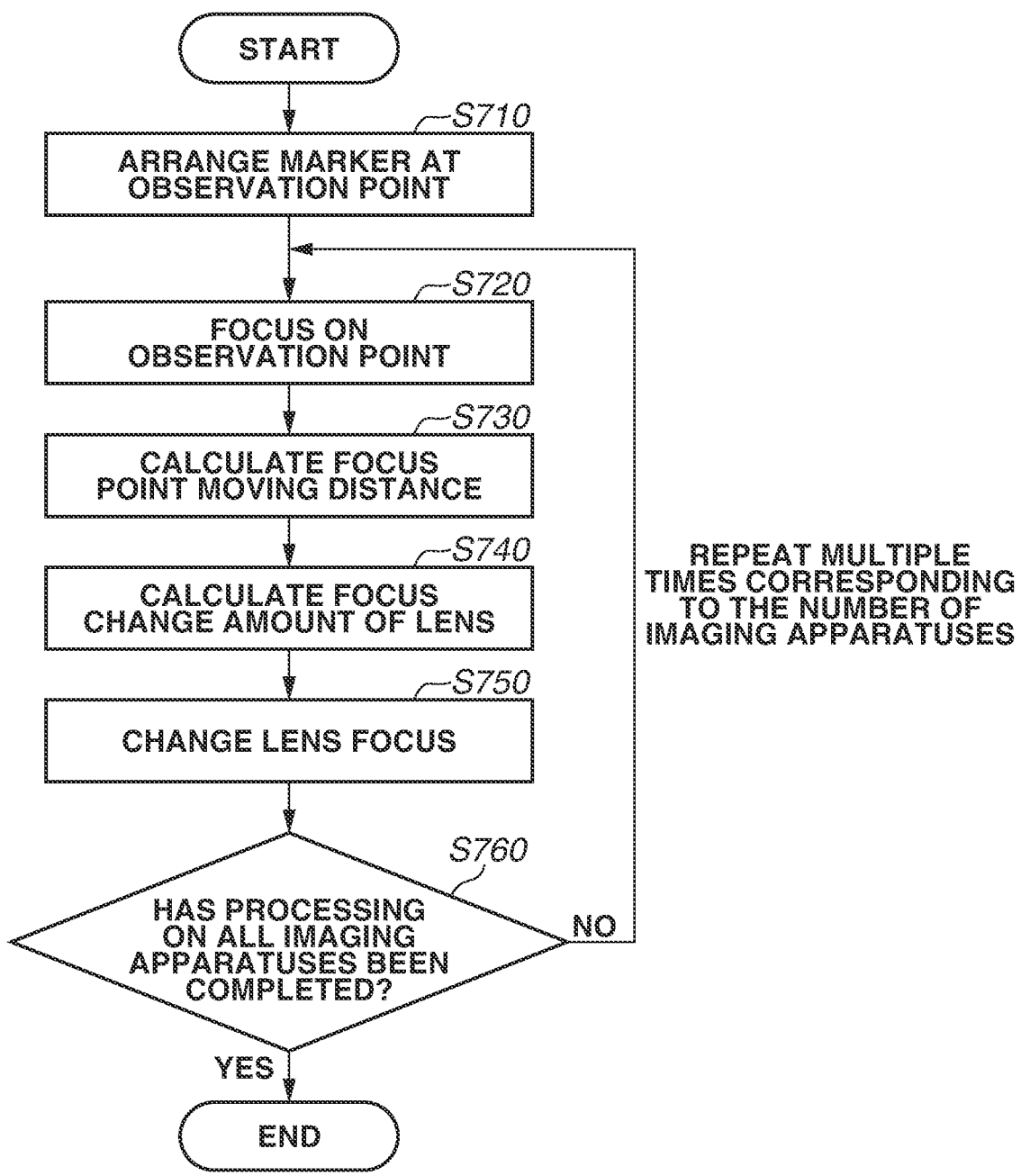
FIG. 12 is a flowchart illustrating an example of processing performed by the information processing apparatus.

The details of processing executed in step S810 will be described with reference to FIG. 12.

In step S710, the CPU 211 waits for a marker to be arranged at the observation point 130. When the CPU 211 notifies the completion of the arrangement of the marker via the UI unit 260, the processing proceeds to step S720.

In step S720, the CPU 211 selects one imaging apparatus from among the imaging apparatuses 100, and instructs the selected imaging apparatus to place a focus on the marker arranged at the observation point 130. An imaging apparatus selected in the latest processing in step S720 during the processing illustrated in FIG. 12 is regarded as a selected imaging apparatus.

In step S730, the CPU 211 calculates, via the depth-of-field calculation unit 226, a depth of field of the selected imaging apparatus around the marker arranged at the observation point 130. More specifically, the CPU 211 acquires, via the parameter acquisition unit 223, parameters (e.g., aperture value, and zoom value) used for the calculation of a depth of field, from the selected imaging apparatus. The CPU 211 also acquires a distance between the selected imaging apparatus and the observation point 130. The distance is prestored in the auxiliary storage device 214. The CPU 211 may acquire the distance between the selected imaging apparatus and the observation point 130 by calculating a distance between the selected imaging apparatus and the observation point 130 using the stadium model data. The CPU 211 then calculates a depth of field of the selected imaging apparatus based on the acquired parameters and the acquired distance between the selected imaging apparatus and the observation point 130.

The CPU 211 calculates, via the depth-of-field calculation unit 226, a moving distance indicating a distance by which the focus point of the selected imaging apparatus is to be moved from the marker position for setting the center of the depth of field to the position of the observation point 130 (marker position).

In step S740, the CPU 211 converts, via the moving amount calculation unit 227, the moving distance obtained for the selected imaging apparatus in step S730 into a moving amount of the lens.

In step S750, the CPU 211 transmits, to the selected imaging apparatus via the parameter setting unit 224 and the command transmission unit 222, a command for instructing the movement of the lens by the moving amount of the lens that has been obtained in step S740. The focus point of the selected imaging apparatus thereby moves from the position of the observation point 130 at which the marker is arranged to a midair position closer to the corresponding imaging apparatus, and becomes a space focus point. The space focus point is an example of a point set on a line segment connecting the selected imaging apparatus and the observation point 130.

The CPU 211 then obtains a distance between the space focus point of the selected imaging apparatus and the selected imaging apparatus. The CPU 211 obtains, as the position of an actual focus point of the selected imaging apparatus, a position at which a distance from the observation point 130 becomes the smallest, among positions on the field surface at which distances from the selected imaging apparatus become the obtained distance. As another example, the CPU 211 may obtain, as the position of an actual focus point, any position of positions at which distances from the observation point 130 become equal to or smaller than a predefined threshold, among positions on the field surface at which distances from the selected imaging apparatus become the obtained distance. Then, the CPU 211 controls the selected imaging apparatus to set a focus point to the position of the obtained actual focus point.

The CPU 211 controls the selected imaging apparatus to set the focus point to the position of the obtained actual focus point using, for example, a predefined focusing method. Examples of the predefined focusing method include an automatic focusing method based on a phase difference or a contrast difference, and a manual focusing method according to a user operation.

In a case where the lenses of the imaging apparatuses have temperature characteristics or an individual difference and the moving amount of the focus point calculated in step S730 is inappropriate, an image captured by the imaging apparatus of which the focus point is controlled in step S750 becomes inappropriate. Thus, it becomes possible to check whether the focus point is appropriately set, by checking a captured image of the selected imaging apparatus of which the focus point has been controlled in step S750.

In step S760, the CPU 211 determines whether the processing in steps S720 to 750 has been completed for all of the imaging apparatuses 100. If the CPU 211 determines that the processing in steps S720 to 750 has been completed for all of the imaging apparatuses 100 (YES in step S760), the CPU 211 ends the processing illustrated in FIG. 12. If the CPU 211 determines that an imaging apparatus for which the processing in steps S720 to 750 has not been completed remains among the imaging apparatuses 100 (NO in step S760), the processing returns to step S720.

Through the above-described processing, in a case where a plurality of imaging apparatuses is arranged so as to surround the observation point 130, it becomes possible to effectively use an imaging region (e.g., focus region, and depth of field) having a blur amount equal to or smaller than an allowable blur amount.

Figure 13:
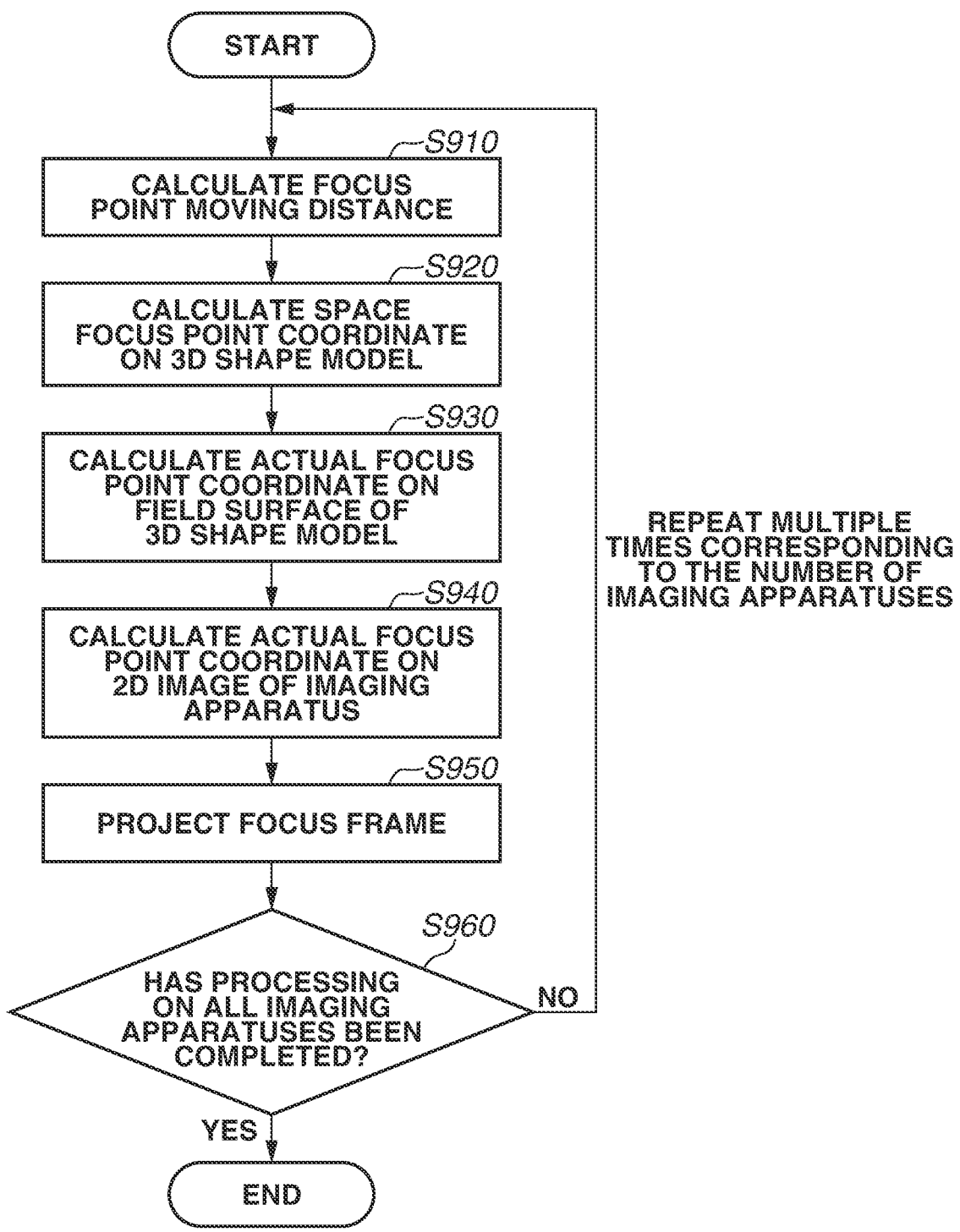
FIG. 13 is a flowchart illustrating an example of processing performed by the information processing apparatus.

The details of the processing in step S820 will be described with reference to FIG. 13.

In step S910, the CPU 211 selects one imaging apparatus from among the imaging apparatuses 100. An imaging apparatus selected in the latest processing in step S910 during the processing illustrated in FIG. 13 is regarded as a selected imaging apparatus. The processing in step S910 is similar to the processing in step S730. Thus, the CPU 211 may omit the processing in step S910 by using the result obtained in step S730.

The following processing in steps S920 to S940 is processing performed via the region determination unit 228.

In step S920, the CPU 211 calculates a coordinate of a space focus point of the selected imaging apparatus in a three-dimensional coordinate system set in the stadium model data, based on the stadium model data and the moving amount obtained in step S910.

In step S930, the CPU 211 calculates a distance between the space focus point of the selected imaging apparatus and the selected imaging apparatus on the stadium model data. The CPU 211 then determines a position at which a distance from the observation point 130 becomes the smallest, among positions on the field surface at which distances from the selected imaging apparatus become the obtained distance, and obtains the coordinate of the determined position as a coordinate of an actual focus point of the selected imaging apparatus. As another example, the CPU 211 may calculate, as a coordinate of an actual focus point, a coordinate of any position of positions at which distances from the observation point 130 become equal to or smaller than a predefined threshold, among positions on the field surface at which distances from the selected imaging apparatus become the obtained distance.

In step S940, the CPU 211 determines which coordinate on a two-dimensional coordinate system set in a captured image (on an image sensor) of the selected imaging apparatus corresponds to the coordinate calculated in step S930.

In step S950, the CPU 211 displays a frame indicating the focused position on the UI unit 260, based on the two-dimensional coordinate obtained in step S940. The frame is superimposed on an image captured by the selected imaging apparatus.

In step S960, the CPU 211 determines whether the processing in steps S910 to S950 has been completed for all of the imaging apparatuses 100. If the CPU 211 determines that the processing in steps S910 to S950 has been completed for all of the imaging apparatuses 100 (YES in step S960), the CPU 211 ends the processing illustrated in FIG. 13, if the CPU 211 determines that an imaging apparatus for which the processing in steps S910 to S950 has not been completed remains among the imaging apparatuses 100 (NO in step S960), the processing returns to step S910.

Figure 14:
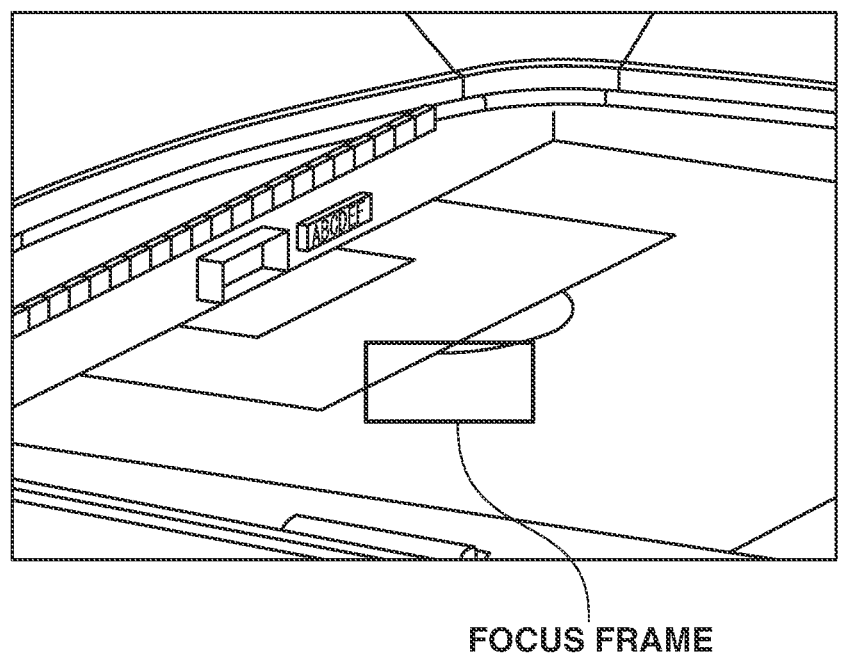
FIG. 14 is a diagram illustrating an example of a screen in which a focus frame is superimposed on a captured image.

FIG. 14 is a diagram illustrating an example of a screen displayed on the UI unit 260 in step S950. A frame indicating a focus position is displayed with being superimposed on a captured image. In the example illustrated in FIG. 14, the CPU 211 displays a rectangular frame centered on the two-dimensional coordinate point obtained in step S940, with being superimposed on the captured image. The frame is an example of a display object. By checking the displayed screen, the user can visually check a focus state in the focus frame and determine the validity.

As described above, through the processing according to the present exemplary embodiment, the information processing system can extend a region in which a virtual viewpoint image can be generated so that the respective focus states of the imaging apparatuses 100 can be checked.

In a second exemplary embodiment, an information processing system determines, for each of the imaging apparatuses 100, the position of an actual focus point on a field surface, and then sets the position of the determined actual focus point as a focus point.

A system configuration of the information processing system is similar to that of the first exemplary embodiment. Further, a hardware configuration and a functional configuration of an information processing apparatus 200 are similar to those of the first exemplary embodiment.

Figure 15:
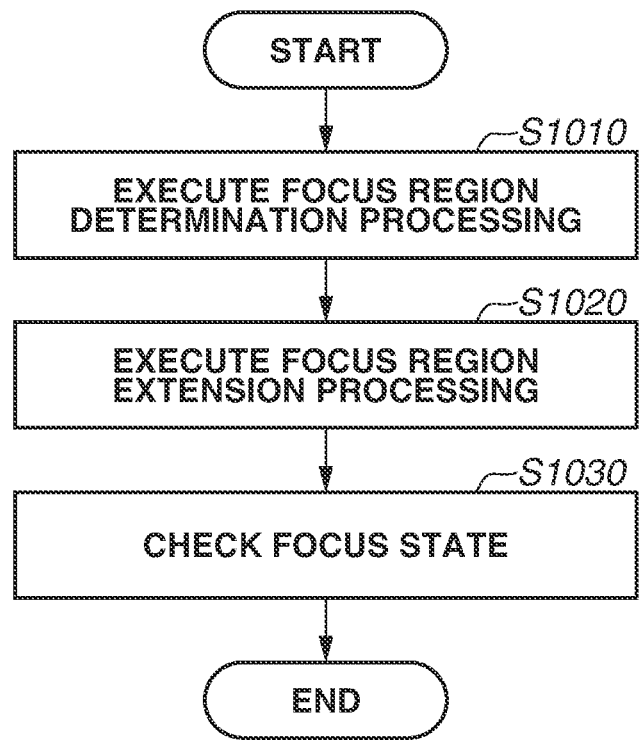
FIG. 15 is a flowchart illustrating an example of processing performed by an information processing apparatus.

FIG. 15 is a flowchart illustrating an example of processing performed by the information processing apparatus 200 according to the present exemplary embodiment.

In step S1010, the CPU 211 determines the position of an actual focus point for each of the imaging apparatuses 100. More specifically, the CPU 211 performs the following processing.

The CPU 211 acquires, from the auxiliary storage device 214 via the parameter acquisition unit 223, parameters (e.g., aperture value, and zoom value) used for a calculation of a depth of field. In the present exemplary embodiment, fixed values of parameters (e.g., aperture value, and zoom value) of each of the imaging apparatuses 100 are prestored in the auxiliary storage device 214. The CPU 211 also acquires a distance between each of the imaging apparatuses 100 and the observation point 130 prestored in the auxiliary storage device 214. The CPU 211 may acquire the distance between each of the imaging apparatuses 100 and the observation point 130, by calculating a distance between each of the imaging apparatuses 100 and the observation point 130 using the stadium model data.

The CPU 211 then calculates a depth of field of each of the imaging apparatuses 100 based on the acquired parameters and the acquired distance between each of the imaging apparatuses 100 and the observation point 130.

Based on the calculated depth of field, the CPU 211 calculates, for each of the imaging apparatuses 100, a moving amount indicating an amount by which the focus point is to be moved from the marker position for setting the center of the depth of field at the position of the observation point 130 (marker position). A point moved from the marker position by the moving amount toward a corresponding imaging apparatus becomes a space focus point of the imaging apparatus.

The CPU 211 calculates a coordinate of a space focus point of each of the imaging apparatuses 100 in a three-dimensional coordinate system set in the stadium model data, based on the stadium model data and the calculated moving amount. The CPU 211 then calculates, for each of the imaging apparatuses 100, a distance between a space focus point and a corresponding imaging apparatus on the stadium model data. The CPU 211 determines, for each of the imaging apparatuses 100, a position at which a distance from the observation point 130 becomes the smallest, among positions on the field surface at which distances from a corresponding imaging apparatus become the obtained distance, and calculates a coordinate of the determined position as a coordinate of an actual focus point. As another example, the CPU 211 may calculate, as a coordinate of an actual focus point, a coordinate of any position of positions at which distances from the observation point 130 become equal to or smaller than a predefined threshold, among positions on the field surface at which distances from the corresponding imaging apparatus become the obtained distance.

In step S1020, the CPU 211 controls each of the imaging apparatuses 100 to set the position indicated by the coordinate of the actual focus point obtained in step S1010, as a focus point. The CPU 211 controls each of the imaging apparatuses 100 to set a focus point to the position of the obtained actual focus point using, for example, a predefined focusing method. Examples of the predefined focusing method include an automatic focusing method based on a phase difference or a contrast difference, and a manual focusing method performed according to a user operation.

The selected imaging apparatus may capture an image of a marker arranged at the position of an actual focus point after the actual focus point is set. This improves the accuracy of the focusing executed in step S1020 as compared with the case of performing focusing on a field surface having a small number of feature points and low contrast.

In step S1030, the CPU 211 determines, for each of the imaging apparatuses 100, which coordinate on a two-dimensional coordinate system set in a captured image corresponds to the coordinate calculated in step S1010. Based on the determined coordinate, the CPU 211 displays, for each of the imaging apparatuses 100, a frame indicating a focused position on the UI unit 260. The frame is superimposed on a captured image.

As described above, through the processing according to the present exemplary embodiment, the information processing system can provide an effect similar to that in the first exemplary embodiment.

In the present exemplary embodiment, the information processing system can determine the position of an actual focus point of each of the imaging apparatuses 100 before setting an actual focus point in each of the imaging apparatuses 100, Thus, for example, the information processing system can determine an actual focus point of each of the imaging apparatuses 100 before the imaging apparatuses 100 are actually installed in a stadium, and then set the determined actual focus point after the imaging apparatuses 100 are installed. In this manner, the information processing system can reduce a workload and working hours required after imaging apparatuses are installed by executing part of processing before the imaging apparatuses are installed. The present exemplary embodiment is desirable especially when an environment light condition is stable, such as a case where a stadium is located indoors.

In the first and second exemplary embodiments, the information processing system sets an actual focus point of each of the imaging apparatuses 100 to a position on a field surface. As another example, the information processing system may set an actual focus point of each of the imaging apparatuses 100 to a position on an object (e.g., wall surface, and pole) other than the field surface, as long as an image from which an in-focus state is recognizable can be captured.

For example, the CPU 211 may calculate the position of an actual focus point in step S750 in the following manner. More specifically, the CPU 211 initially calculates a distance between a space focus point of the selected imaging apparatus and the selected imaging apparatus. Then, the CPU 211 may obtain, as the position of an actual focus point of the selected imaging apparatus, a position at which a distance from the observation point 130 becomes the smallest, among positions on the wall surface of the stadium at which distances from the selected imaging apparatus become the obtained distance.

In the first and second exemplary embodiments, the information processing system determines an actual focus point of each of the imaging apparatuses 100 such that a distance between a corresponding imaging apparatus and a space focus point and a distance between the imaging apparatus and the actual focus point become equal.

As another example, the information processing system may determine an actual focus point of each of the imaging apparatuses 100 such that a difference between a distance between a corresponding imaging apparatus and a space focus point and a distance between the imaging apparatus and the actual focus point becomes equal to or smaller than a predefined threshold.

According to an exemplary embodiment of the present disclosure, the focus states of a plurality of imaging apparatuses can easily be checked even if focus ranges of the imaging apparatus are expanded.

An exemplary embodiment of the present disclosure can also be implemented by processing of supplying a program for implementing one or more functions of the above-described exemplary embodiments, to a system or an apparatus via a network or a storage medium, and reading and executing the program by one or more processors in a computer of the system or the apparatus. In addition, an exemplary embodiment of the present disclosure can also be implemented by a circuit (e.g., ASIC) that implements one or more functions.

For example, part or all of the above-described functional configurations of the information processing system may be mounted on the information processing apparatus 200 as hardware. Heretofore, exemplary embodiments of the present disclosure have been described in detail, but the present disclosure is not limited to a specific exemplary embodiment. For example, the above-described exemplary embodiments may be arbitrarily combined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-084152, filed Apr. 25, 2019, which is hereby incorporated by reference herein in its entirety.

What is claimed is:

1. An information processing apparatus comprising:
one or more memories storing instructions; and
one or more processors executing the instructions to:
specify a position of a focus point of an imaging apparatus configured to capture an object and be used for generating a virtual viewpoint image, the position of the focus point being on an optical axis of the imaging apparatus and being closer to a position of the imaging apparatus than a first position located on the object;
determine a second position located on the object based on a distance between the specified position of the focus point and the position of the imaging apparatus, the second position located on the object being not on the optical axis of the imaging apparatus;
specify a position located on an image captured by the imaging apparatus, the position located on the image corresponding to the determined second position located on the object; and
output information related to the specified position located on the image.

2. The information processing apparatus according to claim 1, wherein the position of the focus point is a position deviated from the first position located on the object by a predefined distance on the optical axis of the imaging apparatus.

3. The information processing apparatus according to claim 1, wherein the position of the focus point is a position of a focus point of the imaging apparatus on the optical axis of the imaging apparatus in a case where a center of a depth of field of the imaging apparatus corresponds to the first position located on the object.

4. The information processing apparatus according to claim 1, wherein a position located on the object at which a distance from the imaging apparatus becomes equal to the distance between the specified position of the focus point and the position of the imaging apparatus is determined as the second position located on the object.

5. The information processing apparatus according to claim 1, wherein the second position located on the object is determined based on the distance between the specified position of the focus point and the position of the imaging apparatus and three-dimensional shape data of the object.

6. The information processing apparatus according to claim 1, wherein the second position located on the object is set as a focus point of the imaging apparatus using a marker arranged at the second position located on the object.

7. The information processing apparatus according to claim 1, the one ore more processors further execute the instructions to cause a display device to display the image captured by the imaging apparatus.

8. The information processing apparatus according to claim 7, wherein the display device displays the image captured by the imaging apparatus and a display object indicating an actual focus point with being superimposed on the image.

9. The information processing apparatus according to claim 7, the output information related to the specified position located on the image is displayed on the image using a frame.

10. The information processing apparatus according to claim 1, wherein the object is a field.

11. The information processing apparatus according to claim 1, wherein the output information related to the specified position located on the image is used for a user checking a focus state of the imaging apparatus.

12. An information processing method comprising:
specifying a position of a focus point of an imaging apparatus configured to capture an object and be used for generating a virtual viewpoint image, the position of the focus point being on an optical axis of the imaging apparatus and being closer to a position of the imaging apparatus than a first position located on the object;
determining a second position located on the object based on a distance between the specified position of the focus point and the position of the imaging apparatus, the second position located on the object being not on the optical axis of the imaging apparatus;
specifying a position located on an image captured by the imaging apparatus, the position located on the image corresponding to the determined second position located on the object; and
outputting information related to the specified position located on the image.

13. A non-transitory computer-readable storage medium storing a program causing a computer to execute an information processing method comprising:
specifying a position of a focus point of an imaging apparatus configured to capture an object and be used for generating a virtual viewpoint image, the position of the focus point being on an optical axis of the imaging apparatus and being closer to a position of the imaging apparatus than a first position located on the object;

determining a second position located on the object based on a distance between the specified position of the focus point and the position of the imaging apparatus, the second position located on the object being not on the optical axis of the imaging apparatus;

specifying a position located on an image captured by the imaging apparatus, the position located on the image corresponding to the determined second position located on the object; and outputting information related to the specified position located on the image.

* * * * *